United States Patent
Myers et al.

(10) Patent No.: US 6,454,317 B1
(45) Date of Patent: Sep. 24, 2002

(54) VERSATILE END PLATE CONVERTER DESIGN USING POWDER METAL

(75) Inventors: Stephen Joe Myers, Owosso; Jeffrey B. Hardesty, Byron, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/542,158

(22) Filed: Apr. 4, 2000

(51) Int. Cl.7 ............................................... F16L 23/00
(52) U.S. Cl. ...................................... 285/405; 285/331
(58) Field of Search ................................ 285/405, 331, 285/412, 368

(56) References Cited

U.S. PATENT DOCUMENTS

| | | | |
|---|---|---|---|
| 1,686,713 A | * 10/1928 | Scott | 406/194 |
| 4,643,458 A | 2/1987 | Ammar | |
| 4,730,852 A | 3/1988 | Arscott | |
| 5,415,433 A | * 5/1995 | Hayashi | 285/405 |
| 5,618,501 A | * 4/1997 | Wieres et al. | 422/180 |
| 5,765,881 A | 6/1998 | Perner | |
| 5,909,916 A | 6/1999 | Foster et al. | |
| 5,967,566 A | * 10/1999 | Schlicht | 285/55 |
| 6,076,864 A | * 6/2000 | Levivier et al. | 285/405 |
| 6,102,450 A | * 8/2000 | Harcourt | 285/401 |

* cited by examiner

Primary Examiner—Paul N. Dickson
Assistant Examiner—David R. Dunn
(74) Attorney, Agent, or Firm—Vincent A. Cichosz

(57) ABSTRACT

A solid plate of material has an outer side and an inner side. A hole is disposed in and through the solid plate, the hole being capable of receiving from the outer side one end of an exhaust pipe. The inner side of the solid plate has a collar capable of being received within an annular edge of a catalytic converter housing. The outer and inner sides of the end plate have an area outside the circumference of the catalytic converter housing that contains at least one hole capable of receiving a bolt or other fastening mechanism.

27 Claims, 3 Drawing Sheets

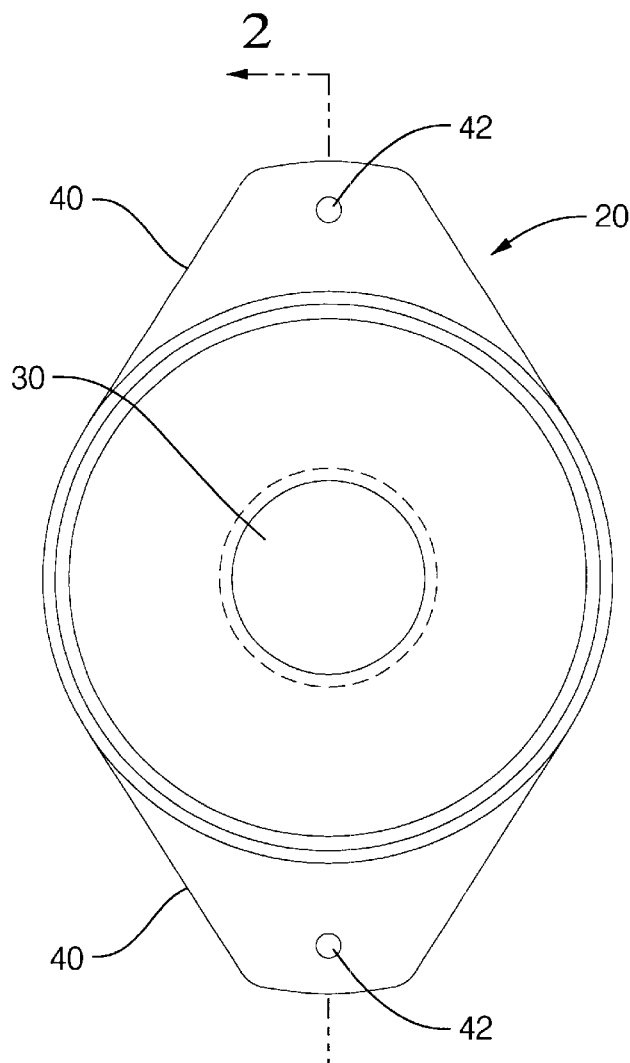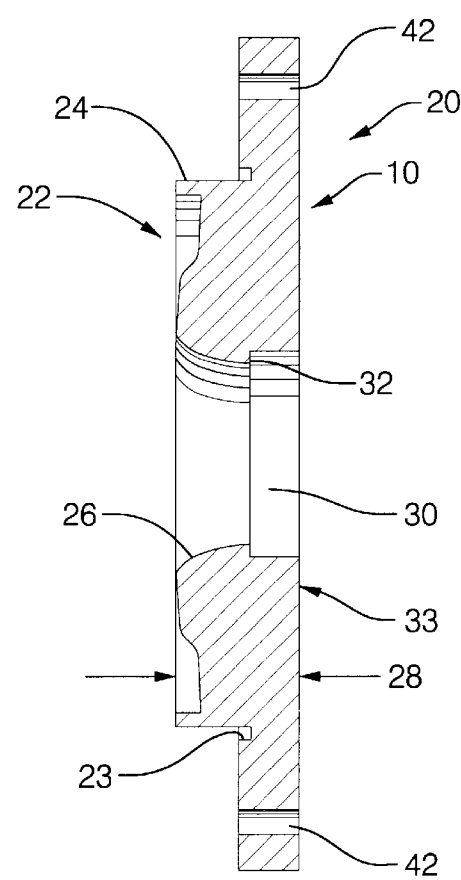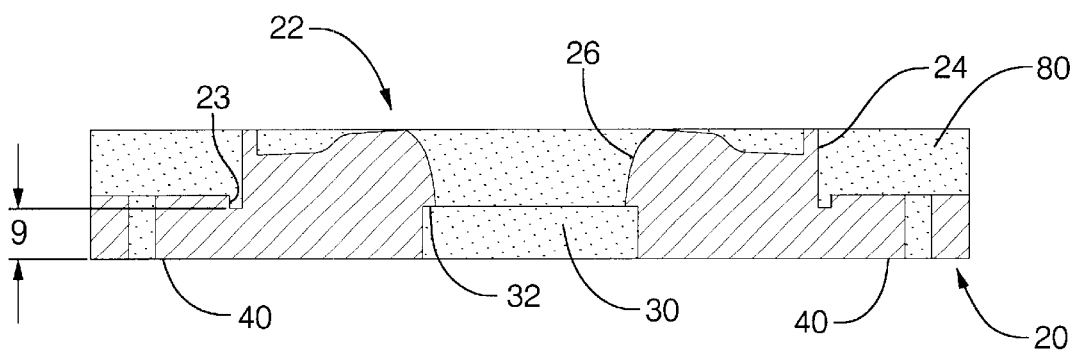
FIG. 1    FIG. 2
FIG. 3

VERSATILE END PLATE CONVERTER DESIGN USING POWDER METAL

TECHNICAL FIELD

The present invention relates to catalytic converter end plates, and in particular, a unitary body end plate design.

BACKGROUND OF THE INVENTION

End plates are well known components of exhaust systems. These plates serve as both caps and ends to catalytic converter housings and provide openings to allow exhaust gasses to flow through the catalytic converter. For example, conventional end plates are described in U.S. Pat. No. 5,909,916 to Foster et al., and are shown in FIGS. 1, 2, and 3 of the same. End plates are further connected to either the inlet or outlet exhaust flow by welding or bolting to the plate a piece of exhaust system piping or a flange for connecting such exhaust system piping. Conventional flange connectors are shown in U.S. Pat. No. 4,643,458 to Ammar, U.S. Pat. No. 4,730,852 to Arscott, and U.S. Pat. No. 5,765,881 to Pemer.

As can be seen from Ammar and Arscott, the assembly of bolted on flanges to catalytic converters requires excessive material and is labor intensive. Flanges are secured to the converter using multiple bolts, and securing the flange to the converter requires multiple steps within a manufacturing process. Consequently the high complexity of the connector systems translates to high material, assembly, and repair costs.

Similarly, welded flanges carry higher costs through the incorporation of expensive welding procedures into the manufacturing line, including additional testing required to validate the stability of the weld.

What is needed in the art is low cost catalystic converter assembly that is durable and easily assembled.

SUMMARY OF THE INVENTION

The disadvantages and drawbacks of the prior art are overcome and alleviated by the end plate of the present invention, which comprises a plate having an outer side and an inner side; a first opening being disposed in and through said plate, the first opening being capable of receiving from said outer side one end of an exhaust pipe; the inner side of the plate having an annular collar capable of receiving an annular edge of a catalytic converter housing.

Preferably, the end plate of the present invention is fabricated by a powdered metal process, that process comprising: placing a preform material in a mold shaped to provide a negative impression of the end plate, the end plate comprising: a solid plate of material, having an outer side and an inner side; a hole being disposed in and through the solid plate, the hole being capable of receiving from the outer side one end of an exhaust pipe; the inner side of the solid plate having annular collar capable of receiving around itself an annular edge of a catalytic converter housing; and placing within the mold a powdered metal; compacting the powdered metal such that the preform profile defines a reverse profile on the surface of the compacted metal part; and subjecting the pressed part and preform to a temperature between the melting points of the pressed part and the preform, such that the preform material substantially melts away.

The above-described and other features and advantages of the present invention will be appreciated and understood by those skilled in the art from the following detailed description, drawings, and appended claims.

BRIEF DESCRIPTION OF THE DRAWINGS

The present invention will now be described by way of example with reference to the following Figures, which are meant to be exemplary, not limiting, and in which:

FIG. 1 is an overhead view of the versatile end plate of the present invention;

FIG. 2 is a cross-sectional side view of the versatile end plate of the present invention;

FIG. 3 is a cross-sectional side view of the versatile end plate of the present invention indicating material waste eliminated by use of a powdered metal process;

DESCRIPTION OF THE PREFERRED EMBODIMENT

The present invention presents an end plate that advantageously incorporates attributes of both an end plate and a flange into a strong, integral part. As can be seen from FIGS. 1, 2, and 3, this end plate 20, which can be employed at one or both ends of a catalytic converter, for example, is a solid plate of material, having an outer side 10 and an inner side 22. The plate is fabricated such that a hole 30 is formed in and through the solid plate, wherein the hole 30 is designed to receive, from the outer side 10, one end of an exhaust pipe (not shown).

Figure 5:
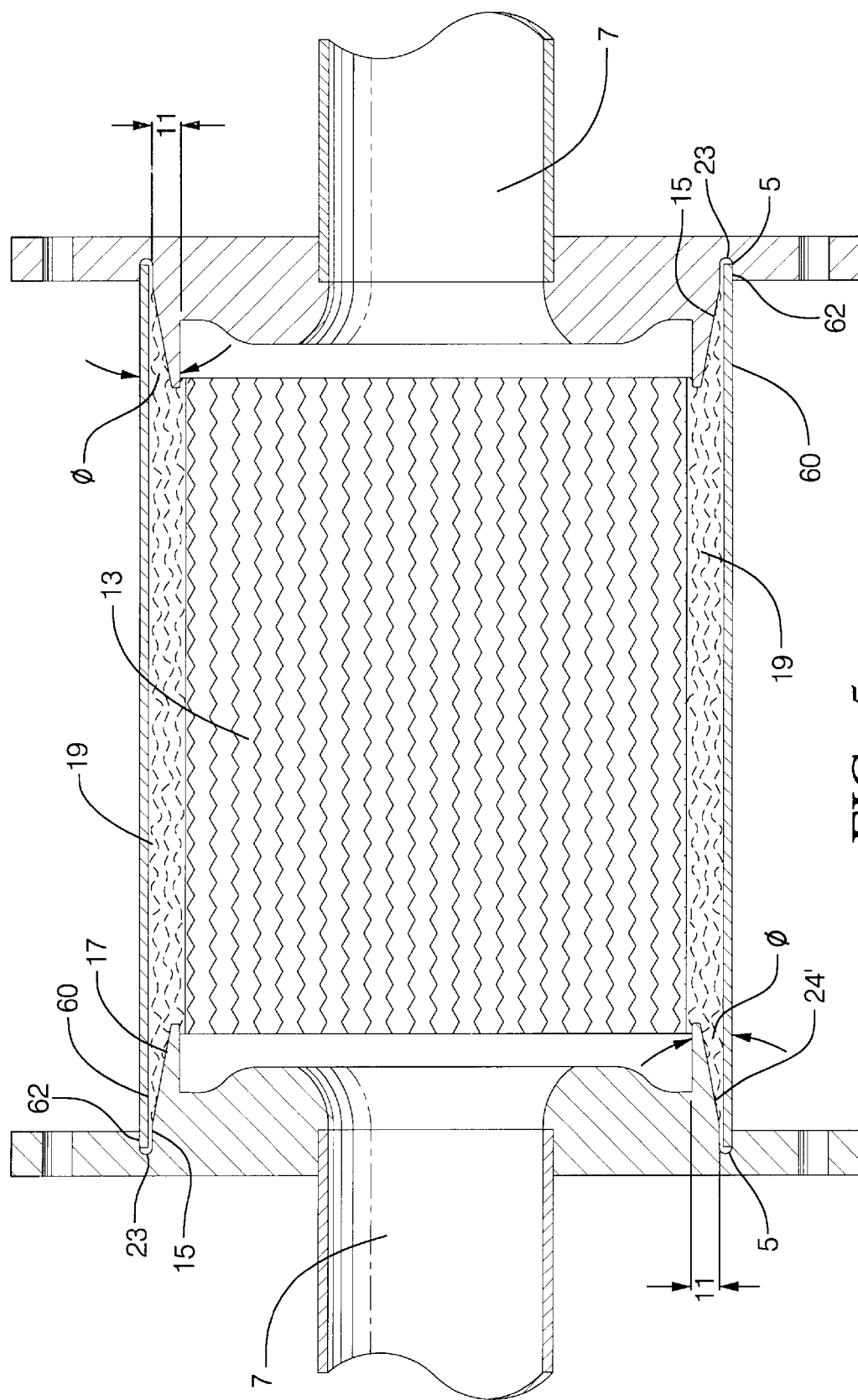
FIG. 5 is a cross-sectional side view of an assembled catalytic converter with a preferred end plate of the present invention.

In one embodiment, it is preferred that the hole 30 be designed to accept an end of exhaust piping up to an inner collar ridge or stop 32, having a more narrow diameter than that of the hole 30. This stop provides for controlled insertion of the exhaust piping, effectively preventing the exhaust piping from entering the area of the converter beyond the end plate. Preferably, for the end plate disposed at the exit of the catalytic converter, the diameter of the hole 30 in the area of the inner ridge 32 is substantially equal to the outer diameter of the exhaust piping 7 (see FIG. 5). The thickness of the inner ridge 32 is preferably substantially equal to the difference between the outer diameter and inner diameter of the exhaust pipe 7, thereby eliminating possible protrusion of the end of the exhaust pipe 7 into the interior space of the catalytic converter and maintaining laminar flow through the hole 30.

In other embodiments, however, the use of stop 32 is not necessary where some other means of controlling tube insertion is employed. An example, though not generally preferred, is the use of inner cones (not shown) in conjunction with versatile end plates 20, where inner cones are positioned inside the converter shell or housing 60 such that their narrow, annular ends fit within or through the holes 30 of the end plates 20. The wider, annular ends of the inner cones are positioned around catalyst 13, located securely within the converter housing 60. In such a configuration, the narrow, annular end of the inner cone is sized to accept an end of exhaust piping (not shown), the exhaust piping is secured to the converter assembly by compressive force between the versatile end plate 20 and an additional flange end piece (not shown). Alternatively, the end of the exhaust piping could be welded to the flange on the flat side, eliminating the bolt holes.

Figure 4:
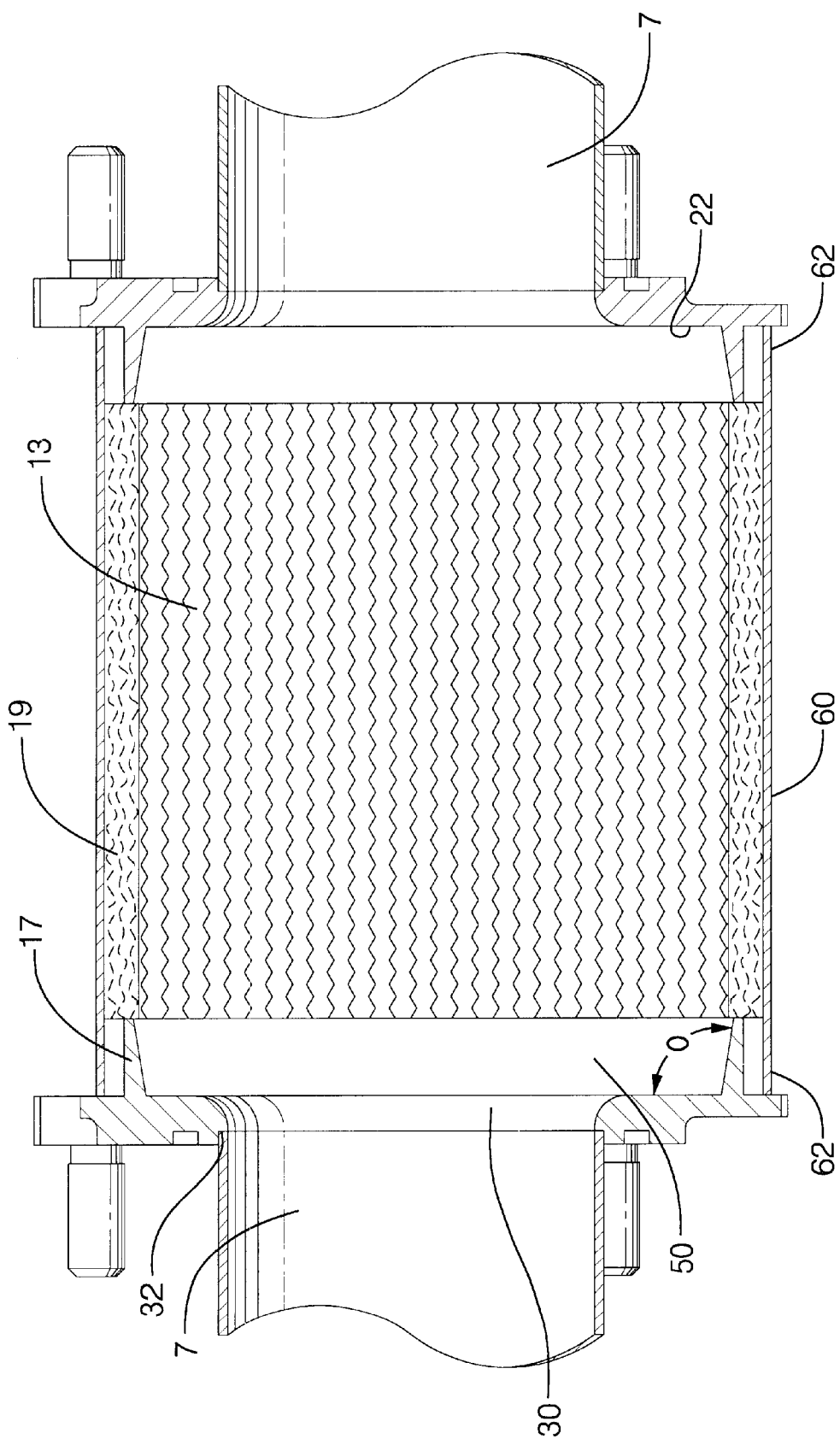
FIG. 4 is a cross-sectional side view of an assembled catalytic converter incorporating one embodiment of the end plate of the present invention.

Referring to FIGS. 2–4, the inner side 22 of the solid plate has an annular collar 24 capable of being received in an annular edge 62 of a catalytic converter housing 60. This annular collar 24 is a guide for positioning of the converter housing 60 and may optionally be large enough to be a weld backup ridge, which provides surface area for the housing 60 to be welded and/or size reduced for a tight seal. The geometry of the annular collar may allow for any degree of insertion within the circumference of the catalytic converter housing such that the end plate 20 is oriented properly with the housing 60 prior to welding or size reduction of the housing to the end plate. Preferably, annular collar 24 is a flat portion extending substantially perpendicular from the inner side 22 of the end plate 20 into the converter housing 60 for a distance of about 2 to about 4 times the shell material thickness (e.g., typically up to about 10 mm).

Alternatively, the annular collar 24' (see FIG. 5) could comprise a substantially straight portion 15 for recognizing and holding the catalytic converter housing 60, and an angled portion 17 which allows insulation 19 to be disposed between the housing and the annular collar 24 and the catalyst 13 to be disposed in intimate contact with the inner surface of the annular collar 24'. Insulation 19 is preferably a mat support material, as is generally known in the art.

In this embodiment, annular collar 24' preferably has a thickness up to the thickness of the mat support material, with a thickness 11 substantially equal to the support thickness preferred.

Angled portion 17 is preferably offset toward the centerline of the catalytic converter and disposed a sufficient distance along straight portion 15 such that the straight portion 15 guides and holds the housing 60. Angle χ formed by angled portion 17 is calculated such that the angled portion 17 has a thickness that allows it to sufficiently shield heat radiation from the end of catalyst 13 while at the same time providing dead air space between angled portion 17 and housing 60 for incorporation of insulation 19 within that space. Accordingly, angle χ can be up to about 45°, with up to about 30° typically preferred, and an angle that diminishes the thickness 11 by about 66% especially preferred.

The length of annular collar 24' is preferably sufficient to such that the annular collar 24' engages the catalyst 13 to protect the catalyst support material from erosion due to exhaust flow and reduce the temperature of the housing 60 due to heating from direct exhaust flow contact and radiant heat from the catalyst. Typically, the length of annular collar 24' can be up to about 8 times, or more, the thickness of the housing 60, with up to about 6 times generally preferred (e.g., typically up to 15.0 mm). It is also preferred that annular collar 24' fit securely within the inner circumference of the converter housing 60.

The annular collar 24 may further comprise a groove 23 coaxially disposed around the collar 24 for holding the converter housing 60 to the end plate 20 prior to welding. Use of such a groove 23 effectively ensures consistency in the manufacturing process and reduces rework costs or scrap. The groove 23 should be of a width at least as great as the thickness of the annular edge 62 of the converter housing 60. The depth of the annular groove may be any depth provided such depth does not adversely effect the structural integrity of the end plate incident to the groove, and is typically up to about 4 mm, while the thickness 9 of the end plate incident the groove is greater than about 8 mm, with greater than about 9 mm preferred. Furthermore, to avoid lowering the stress ratings of the flange radius at the bottom corners, the corners 5 (see FIG. 5) are preferably rounded.

The outer side 10 and inner side 22 can have an area 40 outside the circumference of the catalytic converter housing 60. This area 40 contains at least one, and preferably two or more, holes 42 for attachment of an additional flange end piece (not shown) for securing an exhaust pipe to the end plate.

In a preferred embodiment, the inner side 22 of the end plate 20 is contoured. It is also preferable that the inner contour be flared into and approaching the hole 30 of the endplate 20. This flared region 26 provides an effective region for reducing pressure loss caused by the exhaust flow exiting the converter being impeded by the sharp or protruding end of the exhaust piping compressively oriented against the inner ridge 32. The shape of this flared region 26, when viewed from the inner side 22 of the end plate 20 is generally convex in shape, and preferably has a simple radius of about 5 mm or greater.

Similarly, the thickness 28 of the endplate 20 may be, and indeed is preferably, varied to provide optimal stress distribution across the entire end plate 20. Optimal thickness depends greatly on anticipated stress on the end plate as a function of converter size, exhaust piping size, the size of the inner annular ridge within hole 30, the degree of flare employed incident to the inner ridge, density and material composition of the plate, and the security of the mounting for the entire assembled system. Generally, the shape of the internal contour, and thus the thickness 28 of the end plate, tapers from the flare 26 incident to the hole 30 down to annular collar ridge 24 to disperse stress away from the center of the plate.

The outer side 10 of the end plate 20 may be any geometry according to design choice and efficiency of packaging. Efficiencies of cost and space are maximized when the outer side 10 of the end plate is substantially flat. As such, a substantially flat geometry is preferred for the outer side of the end plate 20.

The versatile end plate may be formed by any method that will form an integral piece, including casting, powdered metal formation, and etching of a blank, among others. Powdered metal forming techniques are preferred, since such methods provide a strong, integral piece having, if required, complex contour characteristics. Further, apart from eliminating welding costs, powdered metal techniques eliminate material waste, which would otherwise arise by either stamping the flange and end plate separately or by etching a versatile end plate from a blank. The amount of material waste eliminated may be seen with reference to FIG. 3, which shows an evacuated area 80 around the part corresponding to the waste or offal typically discarded after stamping or etching.

One possible powdered metal technique that can be employed is a coining process such as the process described in U.S. Pat. No. 5,772,748 to Hubbard, which is incorporated herein in its entirety. Hubbard describes a procedure whereby a preform is positioned within a mold such that the preform defines spaces within the finished part that are to be free from powdered metal material in the finished product. By this sense, the preform is a true negative of the finished part. For the versatile end plate of the present invention, the preferred preform shape will be formed according to the shape of evacuated area 80 shown in FIG. 3.

Forming the end plate comprises placing the powdered metal within the mold and compacting it onto the preform. Preferably, the mold is completely filled with powdered metal since the amount of powdered metal and the degree of compaction will determine the final mass and dimensions of the part. Preferably, an upper punch is brought down into the mold and large forces are applied in order to create the tons per square inch pressures that are required for full compaction.

The compacted part, including powdered metal and preform, are then ejected from the mold and sintered at a temperature between the melting points of the powdered metal and the preform. Accordingly, the preform is melted off, leaving the finished part.

The degree of compaction should be sufficient to produce a part sufficiently dense as to withstand stresses typical in a converter environment. This sufficient density is subject to all of the variables described above in relation to calculation of optimal thickness for inner contour design, including anticipated stress on the end plate, exhaust piping size, the size of the inner annular ridge within the hole, the degree of flare employed incident to the inner ridge, the thickness of the plate, and the security of the mounting for the entire assembled system. Notwithstanding the above considerations, a general target density has been above about 7.0 grams per cubic centimeter, with above about 7.2 grams per cubic centimeter preferred.

Alternately, the metal could be put into the mold and pressed into the "green state," meaning compacted but not yet sintered. The part is then ejected from the mold and sintered in a furnace to weld together the powder metal grains within the green part such that the metal coalesces to a substantially homogeneous state. Such sintering typically takes place at temperatures between about 2000° C. and 2500° C. Once cool, the part is then optionally densified in a second press.

The present invention provides a versatile end plate advantageously incorporating aspects of both a converter end plate and a flange. Because fabrication of the plate provides an integral piece, the present invention does not suffer from the requirements of welds, specifically where an endplate is joined to a flange, which is a source of weakness within an exhaust system and a substantial contributor to high manufacture costs. Similarly, because the end plate is a simple, integral design, the present invention eliminates the need for complex assembly components. Manufacture is simple and cost effective with the simple, durable design of this end plate. Accordingly, this simplified design translates directly to lower exhaust system repair costs.

Finally, production of the part using the powder metal process described above eliminates offal or waste required by individually stamping or etching the flange and end piece. Additionally, by optimizing the inner contour of the piece to provide for stress distribution, e.g., by optimizing the strength and material location on the contour, the overall weight of the versatile endplate can be reduced below conventional levels, thus providing a more durable and less expensive part.

The finished part is made from any metal capable of withstanding exhaust temperatures and stress environment, including ferrous metals, austenitic, martensitic materials, among others. Of these powdered metal versions of AISI (American Iron and Steel Institute), 409, 439 and nickel modified 409 are preferred because they maintain strength and oxidation resistance at exhaust operating temperatures (typically up to about 1,200° C.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An integral catalytic converter end plate and flange, comprising:

a body having a width, a length, and a thickness, the width and length being greater than the thickness;

a hole through the body extending in the direction of the thickness from a first side to a second side of the body; the hole being located at an approximate midpoint of the length and the width;

a collar extending from the second side in the direction of the thickness, the collar comprising a continuous solid wall integrally formed with the body, the wall extending completely around the hole and having an inner surface, an outer surface, and a collar rim, the collar surrounding an interior surface of the second side, the collar operating as a guide when assembling the end plate with a housing of a catalytic converter, the collar being radially spaced from in the hole with the interior surface extending between the hole and the collar;

the body including a flange integrally formed with the body, trio flange extending out from the outer surface of the wall along at least a portion of the wall, the flange having means for attaching an additional flange end piece for securing an exhaust pipe to the end plate; and wherein the first side of the body, including the flange, is substantially flat.

2. The integral catalytic converter end plate and flange of claim 1, the hole being round and the collar being circular, the hole and the collar being coaxially disposed.

3. The integral catalytic converter end plate and flange of claim 1, the hole further comprising a ridge formed therein comprising a shoulder facing the first side, the ridge serving as a stop to prevent over insertion of the exhaust pipe into the hole.

4. The integral catalytic converter end plate and flange of claim 1, the hole further comprising a smooth contour shape extending from the inner surface of the hole in a direction of the thickness and flaring out to extend radially away from the hole, forming the interior surface.

5. The integral catalytic converter end plate and flange of claim 4, the smooth contour shape extending back toward the first side as it approaches the collar.

6. The integral catalytic converter end plate and flange of claim 1, wherein the inner surface of the wall is shorter than the outer surface such that the flange is thinner than the body interior of the collar.

7. The integral catalytic converter end plate and flange of claim 1, wherein the wall forming the collar is thicker at a base of the wall than at the collar rim.

8. The integral catalytic converter end plate and flange of claim 7, wherein the inner surface of the wall is substantially cylindrical and the outer surface tapers toward the inner surface as it reaches the collar rim.

9. The integral catalytic converter end plate and flange of claim 7, the flange comprising a flange rim that extends completely around the collar and at least one flange tab that extends from the flange rim, the means for attaching being formed on the flange tab.

10. The integral catalytic converter end plate and flange of claim 9, the flange rim being thinner than the flange tab, such that the flange rim forms a groove between the collar and the flange tab.

11. The integral catalytic converter end plate and flange of claim 10, the groove having rounded inside corners to reduce stress in the material of the body when bending forces are applied to the tab.

12. The integral catalytic converter end plate and flange of claim 1, the flange comprising a flange rim that extends completely around the collar and at least one flange tab that extends from the flange rim, the means for attaching being formed on the flange tab.

13. The integral catalytic converter end plate and flange of claim 12, the flange rim being thinner than the flange tab, such that the flange rim forms a groove between the collar and the flange tab.

14. The integral catalytic converter end plate and flange of claim 12, wherein the flange includes two tabs.

15. The integral catalytic converter end plate and flange of claim 14, wherein the means for attaching comprises a bolt hole.

16. The integral catalytic converter end plate and flange of claim 1, wherein the means for attaching comprises a bolt hole.

17. The integral catalytic converter end plate and flange of claim 1, the body being formed by sintering.

18. An integral catalytic converter end plate and flange, comprising:

a body having a width, a length, and a thickness, the width and length being greater than the thickness;

a hole through the body extending in the direction of the thickness from a first side to a second side of the body; the hole being located at an approximate midpoint of the length and the width, tile hole further comprising a smooth contour shape extending from an inner surface of the hole in a direction of the thickness and flaring out to extend radially away from the hole;

a collar extending from the second side in the direction of the thickness, the collar comprising a continuous solid wall integrally formed with the body, the wall extending completely around the hole and having an inside surface, an outside surface, and a collar rim, the collar surrounding an interior surface of the second side, the interior surface being at least partially defined by the smooth contour shape, the collar operating as a guide when assembling tho end plate with a housing of a catalytic converter, the collar being radially spaced from the hole with the interior surface extending between the hole and the collar; and the body including a flange integrally formed with the body, the flange extending out from the outer outside surface of the wall along at least a portion of the wall.

19. The integral catalytic converter end plate and flange of claim 18, the hole being round and the collar being circular, the hole and the collar being coaxially disposed.

20. The integral catalytic converter end plate and flange of claim 18, the hole further comprising a ridge formed therein comprising a shoulder facing the first side, the ridge serving as a stop to prevent over insertion of the exhaust pipe into the hole.

21. The integral catalytic converter end plate and flange of claim 18, the smooth contour shape extending back toward the first side as it approaches the collar.

22. The integral catalytic converter end plate and flange of claim 18, wherein the wall forming the collar is thicker at a base of the wall than at the collar rim.

23. The integral catalytic converter end plate and flange of claim 18, the flange comprising a flange rim that extends completely around the collar and at least one flange tab that extends from the flange rim, the means for attaching being formed on the flange tab.

24. The integral catalytic converter end plate and flange of claim 23, the flange rim being thinner than the flange tab, such that the flange rim forms a groove between the collar and the flange tab.

25. The integral catalytic converter end plate and flange of claim 18, wherein the means for attaching comprises a bolt hole.

26. The integral catalytic converter end plate and flange of claim 18, the first side of the body, including the flange, being substantially flat.

27. The integral catalytic converter end plate and flange of claim 18, the body being formed by sintering.

* * * * *